(12) United States Patent
Bovero

(10) Patent No.: US 10,643,325 B2
(45) Date of Patent: *May 5, 2020

(54) SYSTEM AND METHOD FOR IMAGE PROCESSING AND FEATURE RECOGNITION

(71) Applicant: Saudi Arabian Oil Company, Dhahran (SA)

(72) Inventor: Enrico Bovero, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 16/382,411

(22) Filed: Apr. 12, 2019

(65) Prior Publication Data

US 2019/0304087 A1 Oct. 3, 2019

Related U.S. Application Data

(63) Continuation of application No. 15/661,571, filed on Jul. 27, 2017, now Pat. No. 10,275,871.

(51) Int. Cl.
*G06K 9/00* (2006.01)
*G06T 7/00* (2017.01)

(52) U.S. Cl.
CPC ............ *G06T 7/0008* (2013.01); *G06T 7/001* (2013.01); *G06T 7/0004* (2013.01);
(Continued)

(58) Field of Classification Search
None
See application file for complete search history.

(56) References Cited

U.S. PATENT DOCUMENTS 4,969,106 A 11/1990 Vogel et al.
5,524,396 A 6/1996 Lalvani
(Continued)

FOREIGN PATENT DOCUMENTS

| CN | 104570950 A | 4/2015 |
| WO | 2004102471 A2 | 11/2004 |
| WO | 2014171847 A1 | 10/2014 |

OTHER PUBLICATIONS

Aguero et al. "Terrain Modelling via Triangular Regular Networks." School of Electrical Engineering & Computer Science, University of Newcastle, Callaghan, NSW 2308, Australia. 6 pages.
(Continued)

*Primary Examiner* — Stephen P Coleman
(74) *Attorney, Agent, or Firm* — Leason Ellis LLP

(57) ABSTRACT

The present invention is directed to systems and methods for processing multi-dimensional image data to isolate specific features within the image data. One exemplary application is non-destructive testing to detect deformation of structures from image data. The methods for isolating salient features includes generating a "baseline" approximation of the surface image by subdividing the image into a network of triangle planes, approximating the measured value for each plane and subtracting the baseline from the original image data to generate a processed image. The process for defining the triangle-plane network, approximating each plane and performing baseline subtraction can yield a final processed image that includes changes in feature value occurring within a particular triangular plane, which can indicate deformation, while changes in feature value occurring over larger areas, which can be a product of environmental and inspection variables, are at least partially removed from the resulting data set.

17 Claims, 13 Drawing Sheets

(52) U.S. Cl.
CPC ............... *G06T 2207/10028* (2013.01); *G06T 2207/20224* (2013.01); *G06T 2207/30108* (2013.01)

(56) References Cited

U.S. PATENT DOCUMENTS

| | | | |
|---|---|---|---|
| 5,554,983 | A | 9/1996 | Kitamura et al. |
| 5,835,880 | A | 11/1998 | Gan et al. |
| 6,115,048 | A | 9/2000 | Cline et al. |
| 6,222,550 | B1 | 4/2001 | Rosman et al. |
| 6,400,996 | B1 | 6/2002 | Hoffberg et al. |
| 6,411,744 | B1 | 6/2002 | Edwards |
| 6,441,816 | B1 | 8/2002 | Nguyen et al. |
| 7,030,874 | B2 | 4/2006 | Allouche |
| 7,970,229 | B2 | 6/2011 | Connell |
| 9,111,336 | B2 | 8/2015 | Tian et al. |
| 2006/0284870 | A1 | 12/2006 | Ardon et al. |
| 2008/0259072 | A1 | 10/2008 | Blumhofer et al. |

OTHER PUBLICATIONS

Evans et al. "Right Triangular Irregular Network" Algorithmica, 1997. 23 pages.

Bergmann et al. "3D deformation measurement in small areas based on grating method and photogrammetry." Optical Inspection and Micromeasurements. vol. 2782. International Society for Optics and Photonics, 1996. 13 pages.

International Search Report and Written Opinion in corresponding International Patent Application No. PCT/US2018/039651, dated Oct. 12, 2018. 18 pages.

Qiu et al. "A new method for detecting pipeline deformation by an inspection robot with a moving 2D laser rang finder." Robotics and Biomimetics (ROBIO), 2011 IEEE International Conference on. IEEE, 2011. 6 pages.

|  | Dimension 1 | Dimension 2 | Dimension 3 | ... | ... | Dimension $i$ |
|---|---|---|---|---|---|---|
| Point 0 | $x_{10}$ | $y_{20}$ | $z_{30}$ | ... | ... | $d_{k0}$ |
| Point 1 | $x_{11}$ | $y_{21}$ | $z_{31}$ | ... | ... | $d_{k1}$ |
| Point 2 | $x_{12}$ | $y_{22}$ | $z_{32}$ | ... | ... | $d_{k2}$ |
| ... | ... | ... | ... | ... | ... | ... |
| ... | ... | ... | ... | ... | ... | ... |
| Point $i$ | $x_{1i}$ | $y_{2i}$ | $z_{30}$ | ... | ... | $d_{ki}$ |

$i \geq 0$, and $i$ is an interger.

$k \geq 0$, and $k$ is an interger.

SYSTEM AND METHOD FOR IMAGE PROCESSING AND FEATURE RECOGNITION

CROSS-REFERENCE TO RELATED PATENT APPLICATIONS

The present application is a continuation application of U.S. Pat. No. 10,275,871, titled "System and Method for Image Processing and Feature Recognition," filed on Jul. 27, 2017, which is incorporated herein by reference in its entirety.

FIELD OF THE INVENTION

The present invention relates to image processing methodologies and in particular relates to non-destructive testing systems and methods for analyzing surface-image data of a structure to identify structural features including material deformation.

BACKGROUND OF THE INVENTION

Pipeline and vessel structures used in the oil and gas industry are exposed to stresses over time that can accumulate to produce defects in the structure. Unfortunately, it is typically difficult to determine whether such structures are being subjected to damaging stresses until easily observable defects occur.

The availability of non-destructive inspection techniques for structural materials, for instance, nonmetallic pipes used in pipelines, is limited. For the most part, the techniques available so far are either destructive to the material or are experimental and unreliable. Moreover, with respect to the existing image processing systems for detecting features within an image of an inspected surface typically concentrate on averaging, smoothing and isolating features based on frequency. Generally, existing non-destructive systems and monitoring techniques for inspection of materials can be inadequate for efficiently detecting the presence of stresses on or in the material such as tensile stress or compressive stress with sufficient accuracy and precision such that defects can be predicted before they occur.

Surface approximation using computer graphics technologies has been utilized to process image data sets. There exist several methods of surface approximation including, square/rectangle grid approximation that uses smaller squares to discretize a large surface domain, triangular regular network that uses triangles of the same shape, triangular irregular network that uses triangles of any shape and the like. However, current computer technologies and algorithms for surface approximation can require massive digital data storage and expensive computer hardware because of the complexity of the processing algorithms, and monitoring systems.

What is needed is a system and method for efficiently detecting features from surface-image data through computer image processing with sufficient resolution and accuracy. More specifically, an image processing and monitoring system which isolates features and can be used to quantify material deformation of structures from image data collected using optical inspection devices.

It is with respect to these and other considerations that the disclosure made herein is presented.

SUMMARY OF THE INVENTION

The present invention is directed to a computer implemented method for detecting deformation of a structure from multi-dimensional image data of a surface of the structure captured with an optical inspection device.

In one aspect, a computer implemented method for detecting deformation of a structure from multi-dimensional image data of the structure captured using an optical inspection device is provided. In particular, the method includes the step of providing the multi-dimensional image data of the surface of the structure at a processor, wherein the image data comprises a plurality of data-points that are measured using the optical inspection device. More specifically, each data-point includes: 1) location data identifying a respective location on the surface that a respective data-point was captured in at least two dimensions; and 2) feature value data including at least a respective z value for the respective data-point measured using the inspection device. The method also includes the step of applying, with the processor, a surface dividing model to the image data. More specifically, applying the surface dividing model includes the step of dividing the surface represented by the image data into multiple parallelogram-shaped planes, and subdividing each of the parallelogram-shaped planes into two triangle planes, respectively. The method also includes the step of calculating, with the processor, a respective feature value V for each of the triangle planes. More specifically, the feature value for a respective triangle plane is calculated based on a measured feature value z of one or more of the data-points within the respective triangle plane. The method also includes the step of calculating, with the processor based on the feature value, an adjusted feature value Z for each of the plurality of data-points. More specifically, the adjusted feature value Z for a respective data-point is calculated based on the measured feature value z for the respective data-point and the calculated approximate feature value V for a triangle plane that the respective data-point is within. The method also includes the step of generating a processed multi-dimensional image of the surface in which the data set for the processed multi-dimensional image differs from the data set in the provided image data. More specifically, the multi-dimensional image of the surface is generated with the processor based on the adjusted feature value Z of each data-point. The method also includes the step of outputting by the processor on a display, the processed multi-dimensional image of the surface wherein the processed multi-dimensional image depicts in a graphical representation the detected deformation of the surface within a particular triangular plane of the surface dividing model of the image data.

According to another aspect, a system for detecting deformation a structure from multi-dimensional image data of a surface captured with an optical inspection device is provided. The system comprises a computer readable storage medium, a communication interface and a display. The system also comprises one or more processors configured to access the storage medium and that are in operative communication with the communication interface and the display. In addition, the system includes software modules that are stored on the storage medium and executable by the processor.

The software modules include a communication module that, when executed by the processor, configures the processor to receive the multi-dimensional image data including a plurality of data-points that were measured using the optical inspection device. In particular, the data-points comprise: location data identifying, in at least two dimensions, a respective location on the surface that a respective data-point was captured, and feature value data that includes at least a respective feature value z for the respective data-point measured using the inspection device.

The software modules also include a surface dividing module that, when executed by the processor, configures the processor to divide the surface represented by the image data into multiple parallelogram-shaped planes according to a surface dividing model and also subdivide each of the parallelogram-shaped planes into two triangle planes, respectively.

The software modules also include a feature detection module that, when executed by the processor, configures the processor to calculate a respective approximate feature value V for each of the triangle planes. In particular, the approximate feature value V for a respective triangle plane is calculated based on a measured feature value v of one or more of the data-points within the respective triangle plane. In addition, wherein the feature detection module further configures the processor to calculate an adjusted feature value Z for each of the plurality of data-points. In particular, the adjusted feature value Z for a respective data-point is calculated based on the measured feature value z for the respective data-point and the calculated approximate feature value V for a triangle plane that the respective data-point is within.

The software modules also include an image generation module that, when executed by the processor, configures the processor to generate, based on the adjusted feature value Z of each data-point, a processed multi-dimensional image of the surface in which the data set for the processed multi-dimensional image differs from the data set in the provided image data. The image generation module also configures the processor to output the processed multi-dimensional image of the surface using the display. More specifically, the processed multi-dimensional image depicts in a graphical representation the detected deformation of the surface within a particular triangular plane of the surface dividing model of the image data.

These and other aspects, features, and advantages can be appreciated from the accompanying description of certain embodiments of the invention and the accompanying drawing figures and claims.

BRIEF DESCRIPTION OF THE DRAWINGS

FIG. 4A is a conceptual diagram illustrating an data structure of image data according to an embodiment of the present invention;

DETAILED DESCRIPTION OF CERTAIN EMBODIMENTS OF THE INVENTION

Figure 1:
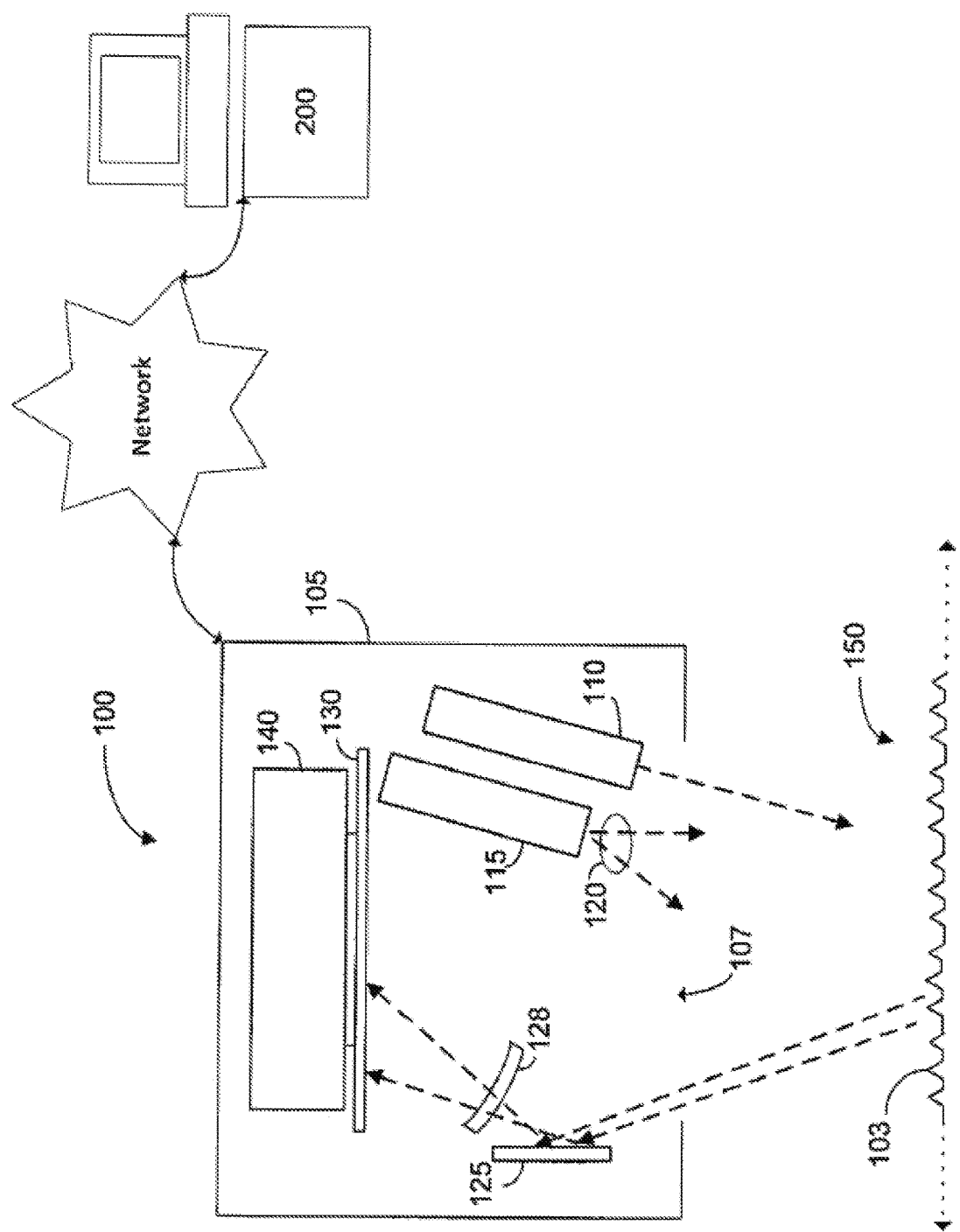
FIG. 1 is a schematic view of an inspection apparatus for capturing multi-dimensional image data of a structure according to an embodiment of the present invention.

By way of overview and introduction, the systems and methods disclosed herein relate to computer implemented image processing methodologies designed for "treatment" of images in order to extrapolate, isolate, highlight and quantify specific features within the image data. As a non-limiting example, the disclosed image processing systems and methods can be applied in non-destructive testing (NDT) systems for inspecting materials and detecting deformations in an otherwise generally uniform material structure. Accordingly, while the exemplary systems and methods are further described herein as being applied in such systems for measuring deformation of material structures, the application of the exemplary processing algorithms is not so limited, as the algorithms can be used for processing and feature detection using any variety of multidimensional images or, more generally, any multidimensional plot, matrix, or tensor (collectively referred to as an "image" or "image data").

Broadly put, the exemplary methods of treating the multi-dimensional image data includes generating a multidimensional "baseline" image and performing baseline subtraction (i.e., subtracting the baseline from the original image) to generate a processed image. For instance, in an exemplary two dimensional image analysis application, the computer implemented method configures a computing device processor to generate a baseline surface that is subtracted from the original image for the purpose of eliminating "long range" variations (e.g., spanning larger areas) from the data-set such that only "sharper" or localized features remain, while the remaining data set is flattened. The disclosed embodiments are more specifically described in connection with processing three-dimensional image data, namely, three-dimensional plots of surface-image data captured using an optical inspection device during NDT inspection of a structure, however, the same procedure can be extended to data sets of higher dimensions as well.

Exemplary structural materials that are configured to facilitate NDT testing and exemplary inspection devices that can be used to generate the three-dimensional surface-image datasets are briefly described herein and further described in co-pending and commonly assigned U.S. patent application Ser. No. 15/082,327, entitled SYSTEMS AND METHODS FOR CONSTRUCTING AND TESTING COMPOSITE PHOTONIC STRUCTURES, filed on Mar. 28, 2016 and naming inventors Bovero et al.

In general, during NDT testing, an inspection apparatus is positioned so as to emit radiation onto an area of a surface of a structure. Radiation diffracted from the surface of the structure (and/or from within the structure) and any periodic features within the structure or on the surface (e.g., periodic gratings, fluorophore materials, and the like) can be detected using a radiation sensor of the inspection device. Accordingly, using the detected diffracted light, a processing apparatus can analyze the image data to determine whether the section of the surface inspected has been subject to deformation.

In order to monitor the condition of large structures in the field, such as pipelines and storage vessels, materials that facilitate NDT testing can be integrated, embedded or attached to the structures to act as indicators of structural condition. Such materials can include structures that undergo a change in an index parameter in response to deformation. One important class of such materials comprises periodic photonic materials, including optical gratings and photonic crystals. Diffraction patterns transmitted by photonic materials in response to irradiation are extremely sensitive to the periodic spacing of their component elements. Thus, any deformation or perturbation from a norm to which embedded photonic materials are subjected, due, for example, to tensile stress, compressive stress, bending, temperature variations, etc., can be revealed in a corresponding difference in the diffraction pattern of the perturbed structure from the norm. The change in diffraction pattern can be proportional to the size of the perturbation and can be captured and measured using an inspection apparatus.

FIG. 1 shows an exemplary embodiment of an inspection apparatus 100 used for inspecting a structure 150 including a photonic material 103 (e.g., embedded in the structure, not shown). The photonic material 103 can comprise a diffraction grating but can also comprise other structures that exhibit a periodic variation in an optical characteristic, such as refraction index. Apparatus 100 comprises a housing 105 containing a number of components used for inspecting the structure that can be positioned and moved as a unit along a length of the structure. For this purpose the housing can be coupled to a vehicle, such as a robot or drone, or alternatively, the housing can include a driving mechanism and wheels for automatic locomotion.

Positioned within housing 105 are radiation sources 110, 115 positioned to direct radiation toward a section of the structure 150 through an opening 107 of the housing. Although two radiation sources are depicted, in some embodiments a single source can be used, and in alternative embodiments, more than two sources can be used. In an exemplary implementation, radiation source 110 is a laser (single wavelength) source and radiation source 115 is a diffused radiation source that emits a plurality of different wavelengths. The diffused radiation source 115 can take a wide range of forms and can emit radiation over a broad or narrow range of wavelengths, in the visible and/or outside the visible spectrum. For example, the diffused radiation source can be implemented using a white LED, a flash light, an X-ray emitter, or natural ambient radiation. One or more lenses e.g., 120 can be configured to focus the radiation emitted by the diffused radiation source 110 onto the structure 150 for inspection.

In operation, radiation received at photonic material 103 can be diffracted and reflected back toward the opening 107 of the inspection apparatus. In some embodiments, apparatus 100 includes a reflector 125 (as depicted) positioned so as to receive radiation diffracted from photonic material. Reflector 125 and one or more focusing components 128 can be oriented to direct and focus the incoming radiation into a radiation sensor 130. Radiation sensor 130 can be implemented in numerous ways including as a digital camera, infrared detector, charge-coupled device (CCD) photomultiplier, photographic film, etc. In implementations in which the sensor constitutes a single element, the magnitude or intensity of the signal output by the sensor is used to determine displacement. For sensors that include an array of elements, such as a CCD array, the response of a particular array element (i.e., position) provides information from which displacement can be determined. In the embodiment depicted, radiation sensor is coupled to and transmits captured sensor data to a local processor 140. The inspection apparatus 100 can be arranged with various computer hardware and software components that serve to enable operation of the inspection device and, more specifically, perform operations relating to the analysis of the information captured by the radiation sensor 130. In addition or in alternative embodiments, the apparatus 100 includes a communication module (e.g., wireless transceiver or other wired or wireless communication interface) for transmitting the sensor data to a remotely-based computing device for further processing of the captured image data, as further described herein.

Figure 2:
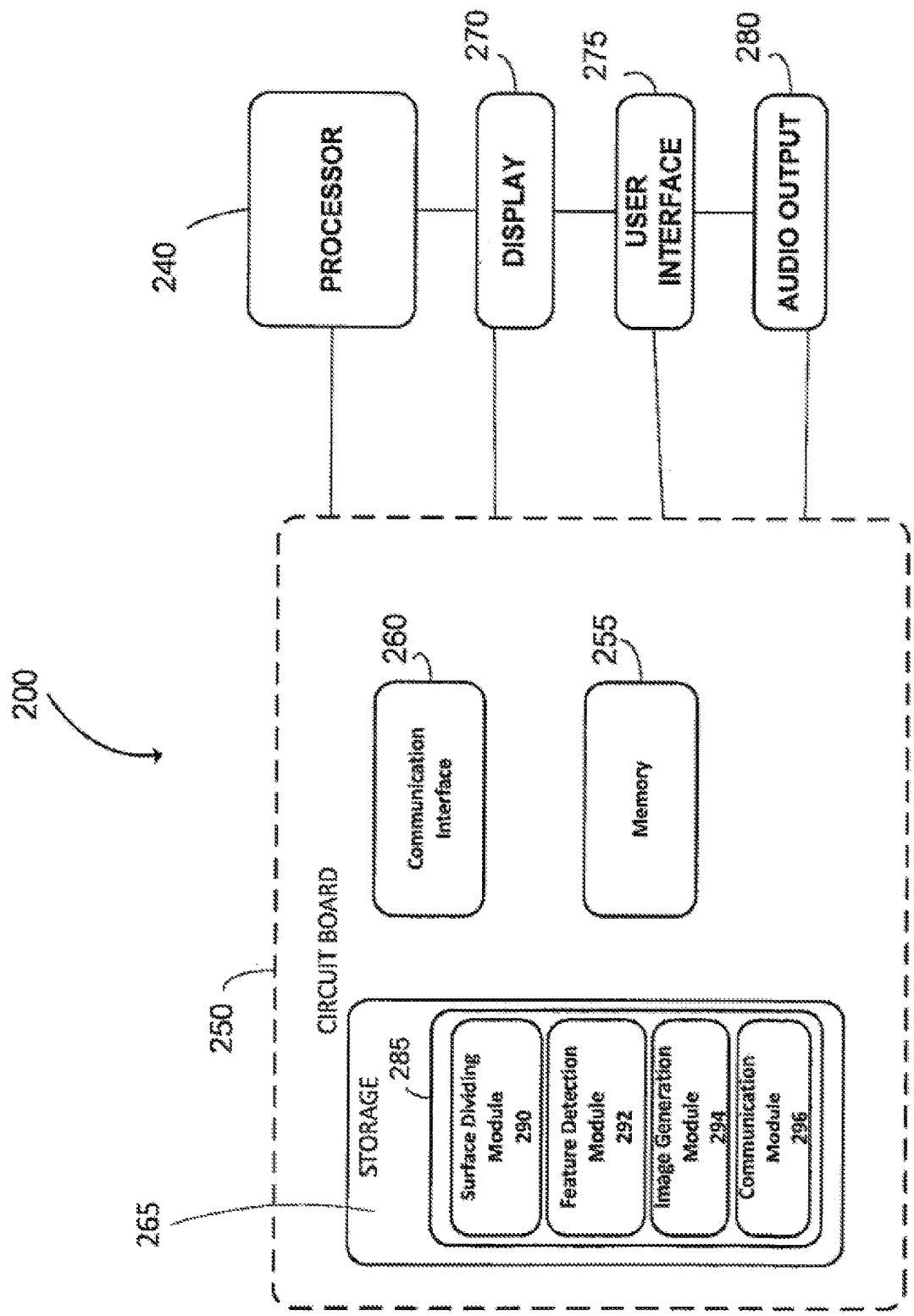
FIG. 2 is a schematic block diagram of components of a computing device for analyzing multi-dimensional image data according to an embodiment of the present invention.

FIG. 2 is a block diagram illustrating depicting exemplary computer hardware and software components of a computing device 200 for processing multi-dimensional image data in accordance with one or more of the disclosed embodiments. The computing device 200 can be arranged with various computer hardware and software components that serve to implement the exemplary methods for analyzing multi-dimensional image data of a surface to selectively detect features. For example and without limitation, in a more specific exemplary implementation further described herein, the computing device can be configured to perform operations relating to the analysis of the image data information captured by the imaging device 100 for the purpose of detecting salient features of the inspected structure (e.g., deformation).

As shown in FIG. 2, components of the computing device 200 include a processor 240 and a circuit board 250. As shown in FIG. 2, the circuit board can include a memory 255, a communication interface 260 and a computer readable storage medium 265 that are accessible by the processor 240. The processor 240 and/or circuit board 250 can also be coupled to a display 270, for visually outputting information to an operator (user), a user interface 275 for receiving operator inputs, and an audio output 280 for providing audio feedback as would be understood by those in the art. As an example, the apparatus 200 could emit a visual signal from the display 270, for instance, the image of a surface captured using the inspection apparatus 100 or a processed image of the surface depicting particular features detected according to the exemplary image processing algorithms further described herein. Although the various components are depicted either independent from, or part of the circuit board 250, it can be appreciated that the components can be arranged in various configurations.

The processor 240 serves to execute software instructions that can be loaded into the memory. The processor 240 can be implemented using multiple processors, a multi-processor core, or some other type of processor. The memory 255 is accessible by the processor 240, thereby enabling the processor to receive and execute instructions stored on the memory and/or on the storage. Memory 255 can be implemented using, for example, a random access memory (RAM) or any other suitable volatile or non-volatile computer readable storage medium. In addition, memory 255 can be fixed or removable. The storage medium 265 can also take various forms, depending on the particular implementation. For example, storage medium 265 can contain one or more components or devices such as a hard drive, a flash memory, a rewritable optical disk, a rewritable magnetic tape, or some combination of the above. The storage medium 265 also can be fixed or removable or remote such as cloud based data storage systems (remote memory or storage configuration not shown). The board 250 can also include or be coupled to a power source (not shown) source for powering the computing device.

One or more software modules 285 are encoded in the memory 255 and/or storage medium 265. The software modules can comprise one or more software programs or applications having computer program code or a set of instructions executed in the processor 240. Such computer program code or instructions for carrying out operations and implementing aspects of the systems and methods disclosed herein can be written in any combination of one or more programming languages. While software modules are stored locally in storage 265 or memory 255 and execute locally in the processor 240, the processor can interact with remotely-based computing platform, preferably wirelessly via communication interface 260, and via a local or wide area network to perform calculations or analysis.

During execution of the software modules 285, the processor 240 is configured to perform various operations relating to the analysis of the multi-dimensional image data, as will be described in greater detail below. The software modules can include, for example and without limitation: a surface dividing module 290, which configures the processor to divide the surface-image data into a number of discrete surfaces; a feature detection module 292, which configures the processor to analyze the feature data within the discrete surfaces and to extrapolate, isolate, highlight and quantify specific features within the surface-image data; an image generation module 294, which configures the processor to generate a processed image representing the surface and highlighting detected features for output via a display 270; and a communication module 296, which configures the processor to communicate with remote devices (e.g., the inspection device 100) over a communication connection (not shown) such as a communication network or any wired or wireless electronic communication connection.

The program code of the software modules 285 and one or more of the non-transitory computer readable storage devices (such as the memory 255 and/or the storage 265) can form a computer program product that can be manufactured and/or distributed in accordance with the present disclosure, as is known to those of ordinary skill in the art. In addition, information and/or data relevant to the configuration and operation of the present apparatuses and methods can also be stored in association with the software modules. Such information can include prescribed settings and parameters relating to the multi-dimensional image data, known characteristics of the structures and objects represented by the multi-dimensional image data (e.g., the expected characteristics of photonic materials that can be inspected such as expected diffraction patterns), and characteristics of features to be detected (e.g., types of material deformation and associated characteristics such as size, shape and the like). Similarly, operational parameters that are specific to the inspection apparatus and facilitate its operation can also be stored.

Figure 3:
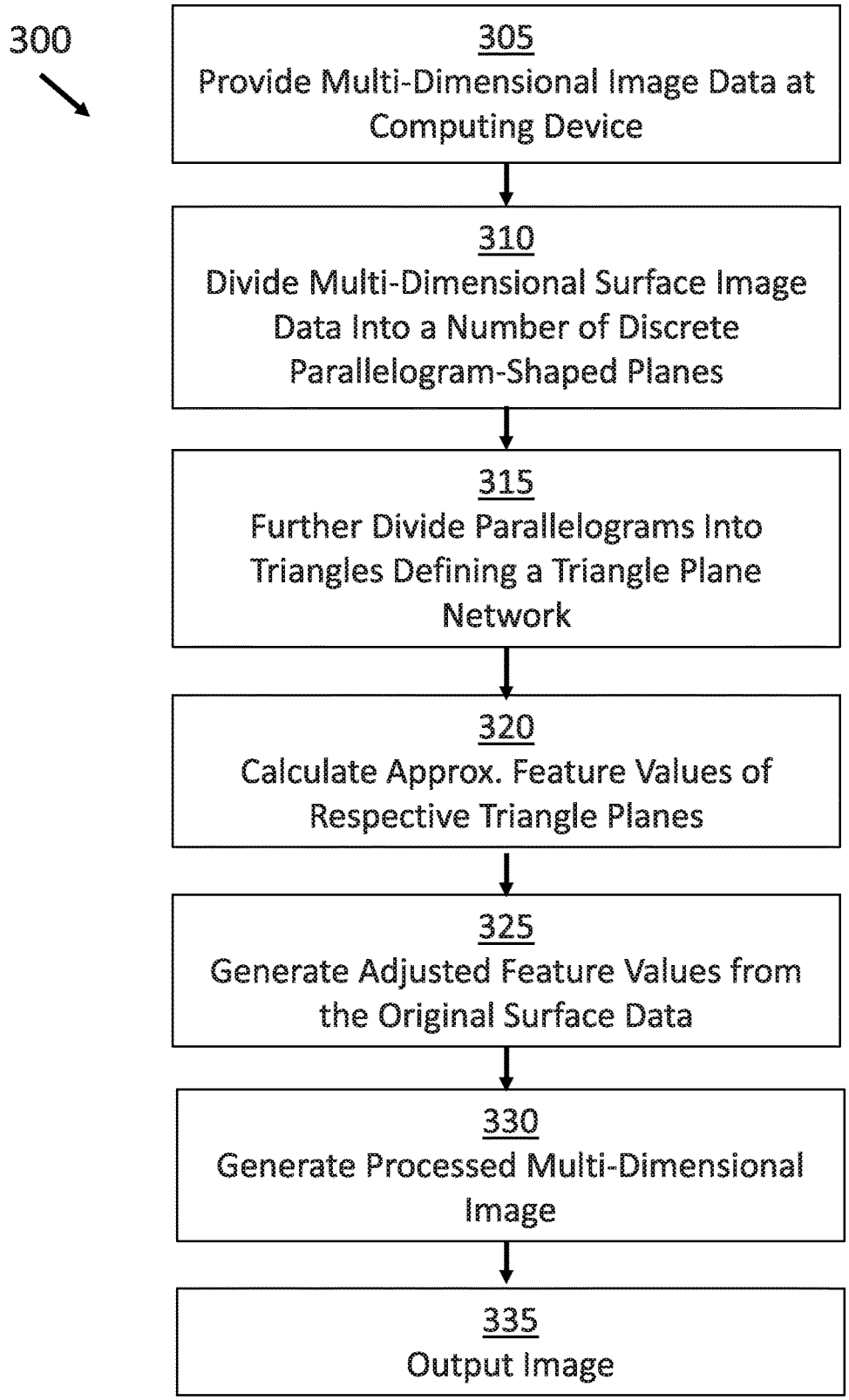
FIG. 3 is a systematic flowchart illustrating a routine for analyzing multi-dimensional image data according to an embodiment of the present invention.

FIG. 3 is a systematic flow diagram of a computer implemented method 300 for analyzing multi-dimensional image data in order to extrapolate, isolate, highlight and quantify specific features within the image data. In particular, the method 300 is described in the context of processing multi-dimensional image data of a surface captured through inspection of the surface using the inspection device 100.

In the NDT example described herein, the surface material can comprise a built-in diffraction grating or other such features having known periodicity such that deformation of the inspected structure locally changes the periodicity of the grating, for instance, by changing the size of the features and/or the relative distance between the features of the grating and, thus, results in a change in the wavelength of reflected light that is captured by the inspection device 100.

Existing systems and method for recordation and storing of the initial and observed grating pattern in a three-dimensional world, and analyzing such data in view of known or expected diffraction characteristics, on a point-by-point basis, can require significant computational resources. Such systems also typically require measuring and mathematically accounting for specific environmental characteristics and inspection related variables that can impact the measured values (e.g., temperature, lighting, the distance and orientation of the inspection device relative to the surface, the shape of the surface and the like). The exemplary systems and methods disclosed herein include a particular combination of steps, which are each performed according to a specific set of rules and parameters, that achieves a more efficient and robust solution for isolating and quantifying salient features in a multi-dimensional image data set at a high degree of accuracy, precision and resolution and while also maintaining a relatively high level of computational efficiency. Concomitantly, the processing algorithms allows for the use of less complex imaging systems and simplified inspection processes. Furthermore, through adjustment of the parameters according to which the various algorithmic image processing steps are performed allows the system to be used to detect any number of different types of features within the image data and thereby provides a highly tunable solution that can be used in a wide variety of applications.

Figure 4B:
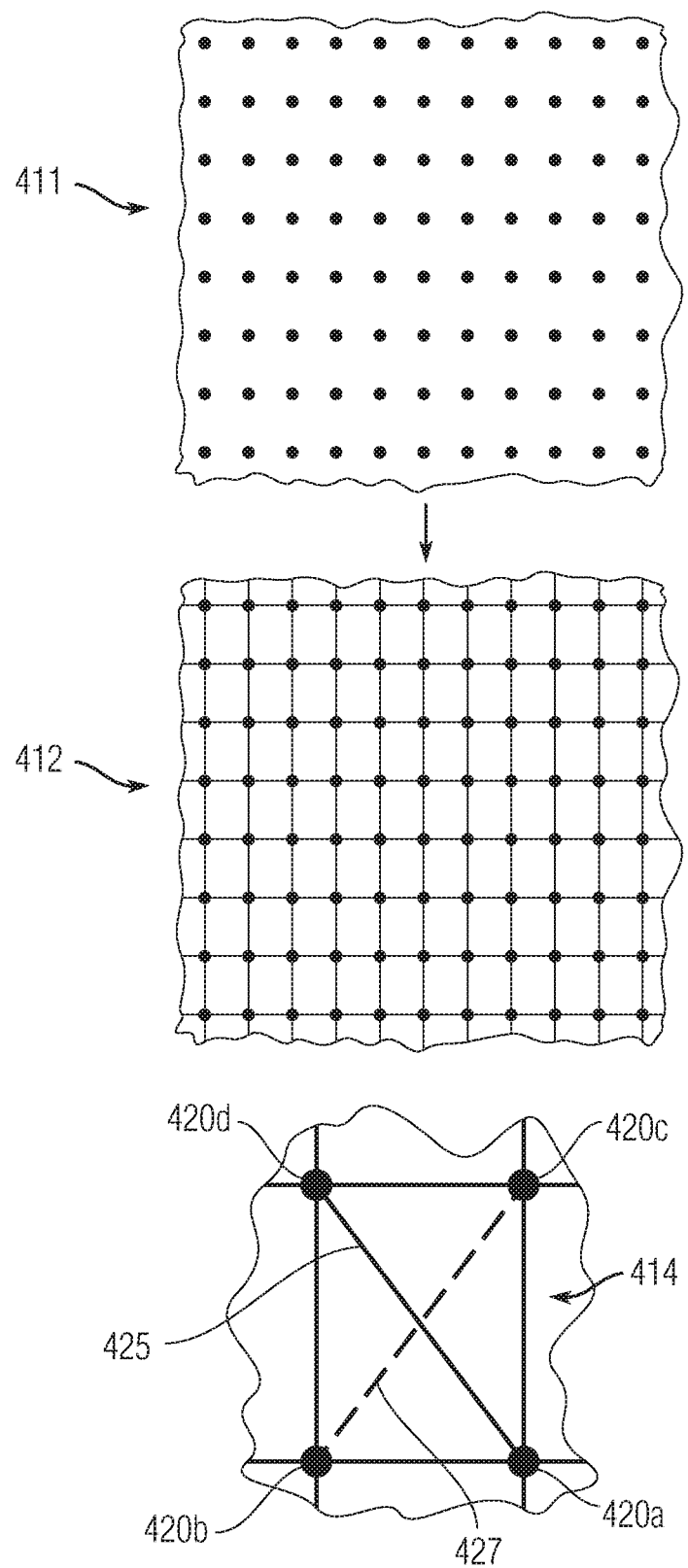
FIG. 4B is a graphical representation of surface-image data at various stages of processing according to an embodiment of the present invention.

Routine 300 starts with step 305, in which the multi-dimensional surface-image data is provided at the computing device 200. As noted, the multi-dimensional data set can be received from the inspection device 100 that is used to inspect the surface, record the measured data and transmit the data set to the computing device. In some implementations, the computing device can receive image data in the form of a pre-processed image, for example, a surface image 411, as illustrated in FIG. 4B(a).

By way of example and without limitation, the multi-dimensional data can also be represented in the format of data plot, matrix, or tensor. FIG. 4A is an exemplary matrix representation of a multi-dimensional dataset 406. The dataset comprises data-points in the number of i. Each data-point comprises k dimensions. Both i and k can be any positive integers (i, k≥0); i and k are mutually independent. As shown in FIG. 4A, a first dimension, "Dimension 1" is represented by the variable "x" and a second dimension, "Dimension 2" is represented by the variable "y." For example, the sub-dataset (x, y) can represent a two dimensional location dataset. For instance, during inspection and capture of the image data-points, the inspection device 100 can be configured to collect the two dimensional positioning data (e.g., x and y position) using on-board positioning sensors (not shown). It should be understood that alternative two dimensional positioning systems can be used without departing from the scope of the disclosed embodiments, for instance, a polar coordination system comprising an angle and a distance value can be used.

Preferably, the multi-dimensional data includes at least one measured dimensional data, "feature data" represented by variable "z." For instance, in the practical NDT example, z can represents a hue value of the radiation diffracted by the inspected surface at a given location, as measured using the inspection device 100. As would be understood, the measured hue value can be directly related to the wavelength of the light reflected by that particular point on the surface and captured by the imaging device.

In some exemplary implementations, the multi-dimensional data 306 can comprise a three-dimensional location dataset (x, y, z), wherein the location dataset comprises longitude, latitude and altitude in reference to a three dimensional Cartesian coordinate system, or a Gauss-Krüger coordinate system and the like. As noted, preferably the measured image data includes one or more measured feature values, (e.g., variable d, which represents the hue value measured by the inspection device at the point having the three-dimensional location).

At step 310 of routine 300, the surface represented by the multi-dimensional image data is divided into a number of discrete sub-regions. More specifically, the processor 240, which is configured by executing one or more of the software modules, including, preferably, the surface dividing module 290, can divide the surface 311 into an integer number of parallelogram-shaped planes 312 according to a surface dividing model. FIG. 4B graphically illustrates a surface 311 (shown as part (a), at top) represented by the image data. FIG. 4B also illustrates the surface, as divided into a number of parallelogram shaped planes, 312 (shown as part (b), middle). In some embodiments, the parallelograms are rectangles, however the parallelograms can also be square shaped.

In addition, at step 315, each parallelogram of surface 312 can be further divided into triangles. More specifically, the processor 240, which is configured by executing one or more of the software modules, including, preferably, the surface dividing module 290, can further divide the parallelogram network of surface 412 into two triangles by one of the diagonal lines of a respective parallelogram.

In some embodiments, the processor can be configured to define the parameters of the surface dividing model. For instance, the configured processor can define the number of parallelograms, as well as the size and shape of the parallelograms. More specifically, the surface dividing model can be defined by the configured processor as a function of the dimensions of the area measured (e.g., the size of the surface and/or its shape).

For example, the network of rectangles can be defined by subdividing the image, (or more generally the dataset) into an integer number of rectangles having the same aspect ratio (or multiple aspect ratios) as the original image (or entire dataset). For example if the image measures 400×300 pixels, it can be divided into 100 rectangles of size 40×30 pixels, or into 10,000 rectangles of size 4×3 pixels, etc. If the entire area of the image (or dataset) cannot be covered completely by an integer number of rectangles (or squares), then approximations, or neglections can be made. FIG. 4B further illustrates an exemplary set of control points 420 that form the vertices of the parallelograms subdividing the surface 312.

In addition or alternatively, the configured processor can define the model to subdivide the image into a network of parallelogram planes having a specific number and size as a function of the target resolution for the analysis and level of detail of the processed image. For instance, the resolution of the parallelogram network, and thus the triangle network, can be defined as a function of the characteristics of features (e.g., size, continuity, etc.) to be isolated and exposed through the image analysis by base-plane subtraction. More specifically, as further described herein, a higher number of subdivisions (i.e., parallelograms) can result in a more detailed "base-plane" image which, when subtracted from the original image, can result in a greater amount of image data (e.g., features) to be smoothened out from the original image and highlighting only changes occurring within discrete parallelograms in a resulting processed image. Accordingly, adjustment of the parameters of the surface dividing model allows the system to be used to selectively isolate and detect features within the image data having various types of characteristics making the disclosed embodiments useful for a wide variety of inspection applications.

FIG. 4B shows, as an example, a close up conceptual view of a particular parallelogram 414 of surface 412, having vertices 420a, 420b, 420c and 420d divided into two triangles along solid diagonal line 425. The dash-dash broken line 427 shows an alternative option for dividing the parallelogram into a triangle plane. Accordingly, the network of parallelograms that have been subdivided into triangles collectively form a triangular plane network, in which each triangle represents a plane of the surface. A triangular network can be an efficient way to process surface data because it simulates surface features according to their spatial relationships, and can use finite number of triangular planes to simulate any curved surface. In the exemplary implementation, the data-points representing the predefined area of the surface each have a measured value z (e.g., a hue value) that represents certain physical characteristics of the surface being inspected.

Figure 4C:
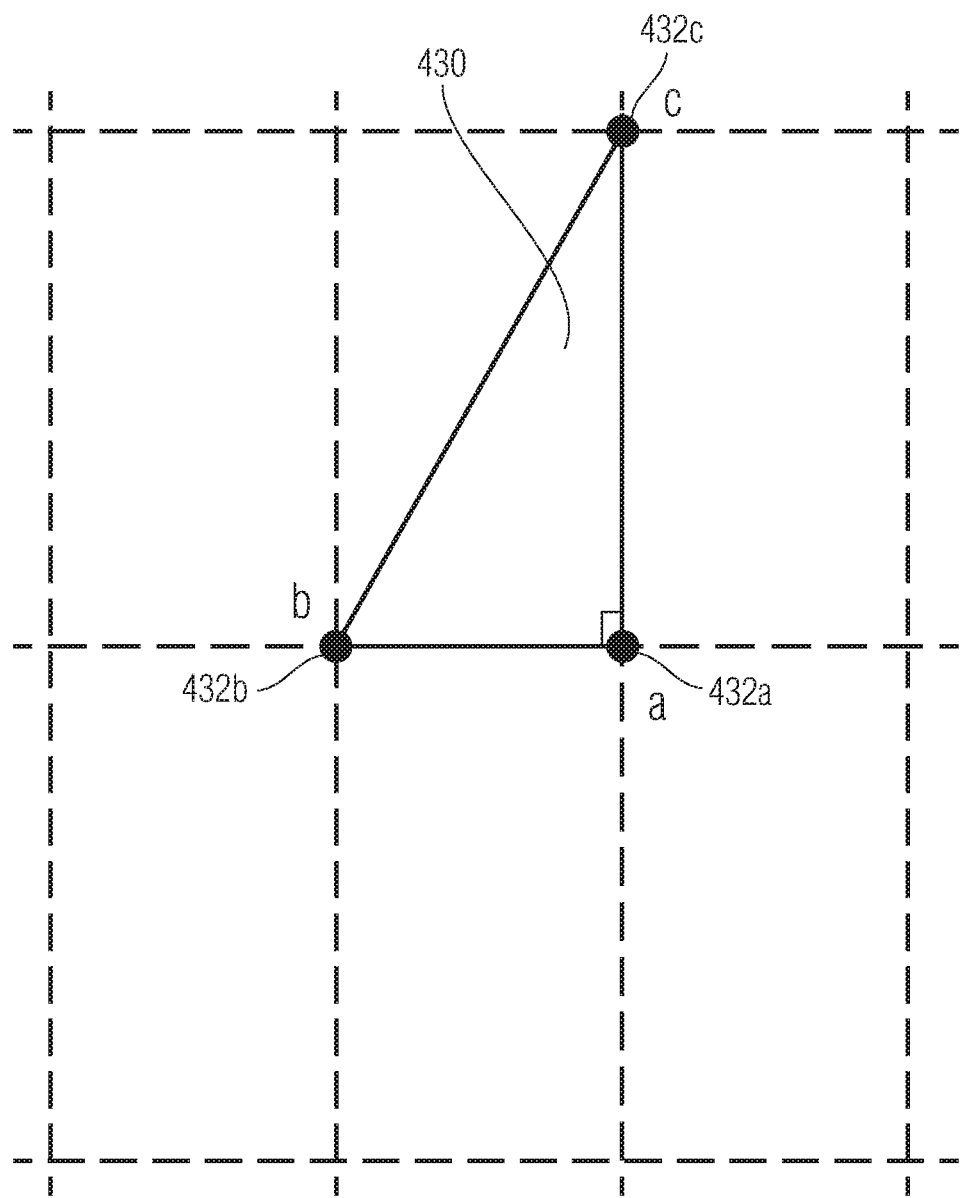
FIG. 4C is a graphical representation of a triangle-plane network of surface-image data according to an embodiment of the present invention.

FIG. 4C illustrates a subset of triangles generated at step 315 that define the triangle network representation of the surface 412. In the exemplary implementation shown in FIG. 4C, diagonal lines of the parallelograms in the network are parallel to each other, however alternative arrangements are possible. In addition, it can be appreciated that, implementations in which the parallelograms are rectangles or squares, result in a network of right-angled triangles, as shown in FIG. 4C. The right-angled triangular network can reduce data structure redundancy, save storage space, and can improve robustness of the surface division and approximation algorithm.

Then at step 320, approximate feature values of respective triangle planes are calculated. Calculation of feature values for a given plane serves to generate an approximation of the measured feature values for the portion of the surface represented by the given plane. In particular, the processor 240, which is configured by executing one or more of the software modules, including, preferably, the feature detection module 292, can calculate an approximate feature values for the portions of the imaged surface represented by respective triangle planes. As further described herein, the approximated feature value can be calculated according to a triangular plane equation.

FIG. 4C illustrates a right angle triangle 430 of the triangular network defined at step 315 and the dash-dash broken lines indicate neighboring triangles also forming part of the triangular network. An approximated feature value Z for each of the triangles of the network can be calculated according to the vertices of the triangles, which can correspond to measured data-points. It should also be understood that the approximated feature value Z can be one or more values, vector representations or equations representing the measured values or an approximation thereof. For instance, because a triangle, e.g., triangle 430, defines a plane, the equation of the plane can be extrapolated from the data-points of its vertices 432a, 432b and 432c, using, for example and without limitation, the relationship between the features given as:

$$a = x_a, y_a, z(x_a, y_a) \quad \text{Equation 1}$$

$$b = x_b, y_b, z(x_b, y_b) \quad \text{Equation 2}$$

$$c = x_c, y_c, z(x_c, y_c) \quad \text{Equation 3}$$

$$\vec{ab} = \begin{bmatrix} x_b - x_a \\ y_b - y_b \\ z(x_b, y_b) - z(x_a, y_a) \end{bmatrix} \quad \text{Equation 4}$$

$$\vec{ac} = \begin{bmatrix} x_c - x_a \\ y_c - y_b \\ z(x_c, y_c) - z(x_a, y_a) \end{bmatrix} \quad \text{Equation 5}$$

$$\vec{ab} \times \vec{ac} = \quad \text{Equation 6}$$

$$\begin{bmatrix} (y_b - y_a) \cdot \begin{pmatrix} z(x_c, y_c) - \\ z(x_a, y_a) \end{pmatrix} - (y_c - y_a) \cdot \begin{pmatrix} z(x_b, y_b) - \\ z(x_a, y_a) \end{pmatrix} \\ \begin{pmatrix} z(x_b, y_b) - \\ z(x_a, y_a) \end{pmatrix} \cdot (x_c - x_a) - \begin{pmatrix} z(x_c, y_c) - \\ z(x_a, y_a) \end{pmatrix} \cdot (x_b - x_a) \\ (x_b - x_a) \cdot (y_c - y_a) - (x_c - x_a) \cdot (y_b - y_a) \end{bmatrix} = \begin{bmatrix} A \\ B \\ C \end{bmatrix}$$

More specifically, in Equation 1, 2, and 3, a, b, and c each represents one vertex of a triangle. Equation 1, for instance, contains location data ($x_a$, $y_a$) with a measured feature value $z(x_a, y_a)$ of data-point 432a, whereas Equation 2 and Equation 3 have same information in the same data structure of data-points 432b and 432c, respectively. While ab and ac are two edges of the triangle, vector $\vec{ab}$ and $\vec{ac}$, as shown in equation 4 and 5, represents two vectors on the same plane. The cross product of $\vec{ab}$ and $\vec{ac}$, shown in equation 6, which is also known in the field of art as "point and a normal" vector, defines a coefficient matrix for the triangle plane in a Cartesian coordination system. Collectively, equations 1-6 serve to approximate individual points of the multi-dimensional data as a triangle plane and the multiple triangular planes together approximate the multi-dimensional image of the surface. There are approaches other than the approach listed above and, as such, equations 1-6 are just one example. The plane can be expressed, for example, using the relationship given as:

$$D = A \cdot x_a + B \cdot x_a + C \cdot z(x_a, y_a) \quad \text{Equation 7}$$

The above expression of a three dimensional plane, can be alternatively expressed by the following exemplary formula:

$$Ax + By + Cz = D \quad \text{Equation 8}$$

Therefore, a feature value of a data-point in a given plane can be approximated using the plane formula equation. Let Z represents the approximate feature value of a data-point. In any given triangular plane of the surface data, an approximate Z value can be calculated using a formula transformation as shown in Equation 9, in which we replace z in Equation 8 by $Z(x_i, y_i)$:

$$Z(x_i, y_i) = \frac{D - Ax_i + Bx_i}{C} \quad \text{Equation 9}$$

As noted, in the exemplary practical NDT application, the approximate Z value can represent hue. Effectively, calculating the approximate Z value for each plane serves to generate an approximate representation of hue value for points within each plane. Furthermore, the contiguous network of so approximated triangle planes serves to generate an approximate representation of the entire set of surface-image data.

It should be understood that, addition to modulating the size of the individual planes to adjust the resolution of the image and selectively highlight different types of features, the particular mathematical algorithm for approximating the individual planes can also be adjusted according to the particular application of the technology.

Then at step 325, adjusted feature values from the original surface data are generated. Step 325 effectively highlights and isolates salient features of the surface-image at respective locations on the surface. In particular, in an exemplary implementation, the processor 240, which is configured by executing one or more of the software modules, including, preferably, the feature detection module 292, can calculate the adjusted feature value V for respective data-points in the surface-image by baseline/base-plane subtraction. More specifically, the configured processor can subtract the approximated Z value of a respective plane from the observed z value of each point of the surface-image data set having the corresponding x and y coordinates, and such difference is defined as the adjusted feature value V.

The exemplary mathematic relationship for calculating the adjusted feature value Z for an individual data-points is shown as in equation 10:

$$V = z(x_i, y_i) - Z(x_i, y_i) \quad \text{Equation 10}$$

It should be appreciated that, in some implementations, the measured feature values z represented by the original surface-image data set can be absolute values (e.g., a measured magnitude) and, as a result of baseline subtraction, the adjusted feature value Z is relative to the approximated feature value V of the corresponding triangle plane. It should also be understood that additional processing can be performed to further refine the adjusted feature value Z for the data-points. For instance, the adjusted feature value of hue can be converted based on known mathematical relationships into a measure of displacement. In addition or alternatively, a "tare" operation can be performed in which with an expected value (e.g., the expected feature value or displacement corresponding to an un-deformed structure) can be subtracted from the adjusted feature value calculated by baseline subtraction (e.g., to quantify only the magnitude of the displacement as an absolute value). It should also be understood that additional data treatment and processing steps can be performed to further refine the resulting data-set and/or convert the data into alternative forms or measures.

Figure 4D:
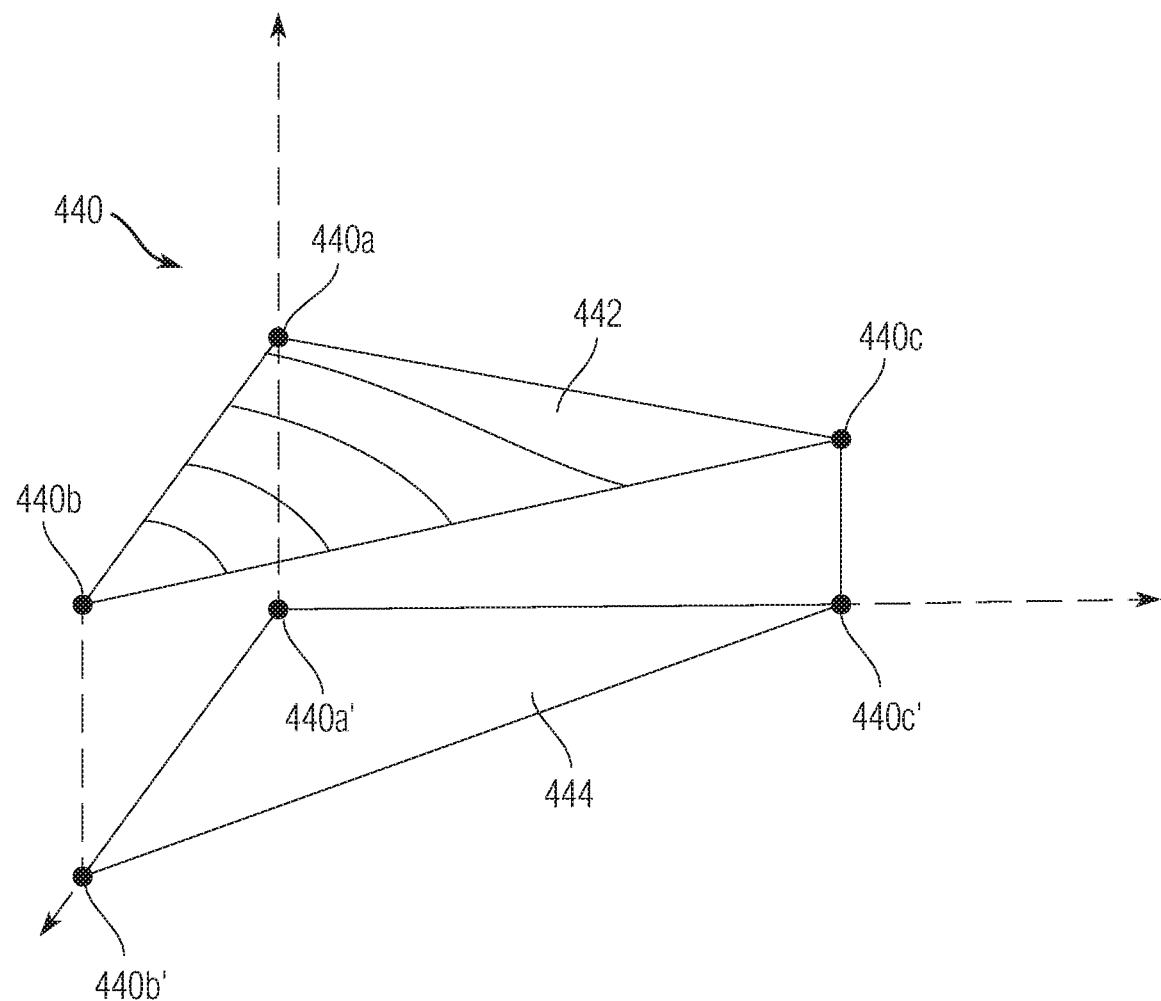
FIG. 4D is a 3-dimensional graphical representation of a triangle-plane of surface-image data according to an embodiment of the present invention.

By way of further example, FIG. 4D graphically illustrates a particular triangle plane 442 of surface 412, having vertices 440a, 440b and 440c represented in three-dimensions and a corresponding two-dimensional representation 444 of the triangle plane, having vertices 440a', 440b' and 440c' determined from three measured data points as described above.

Figure 5A:
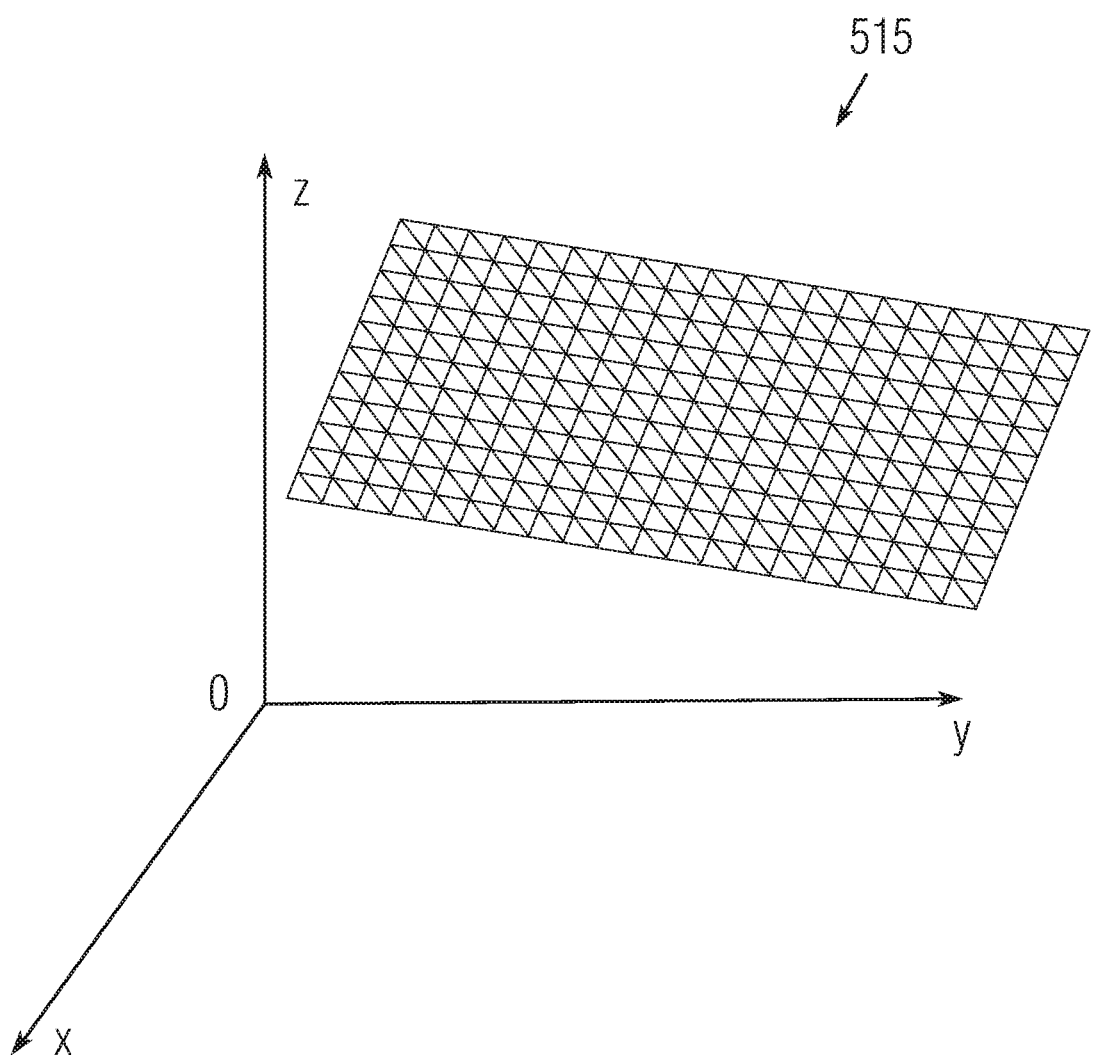
FIG. 5A is a three-dimensional graphical representation of surface-image data comprising observed feature values according to an embodiment of the present invention.
Figure 5B:
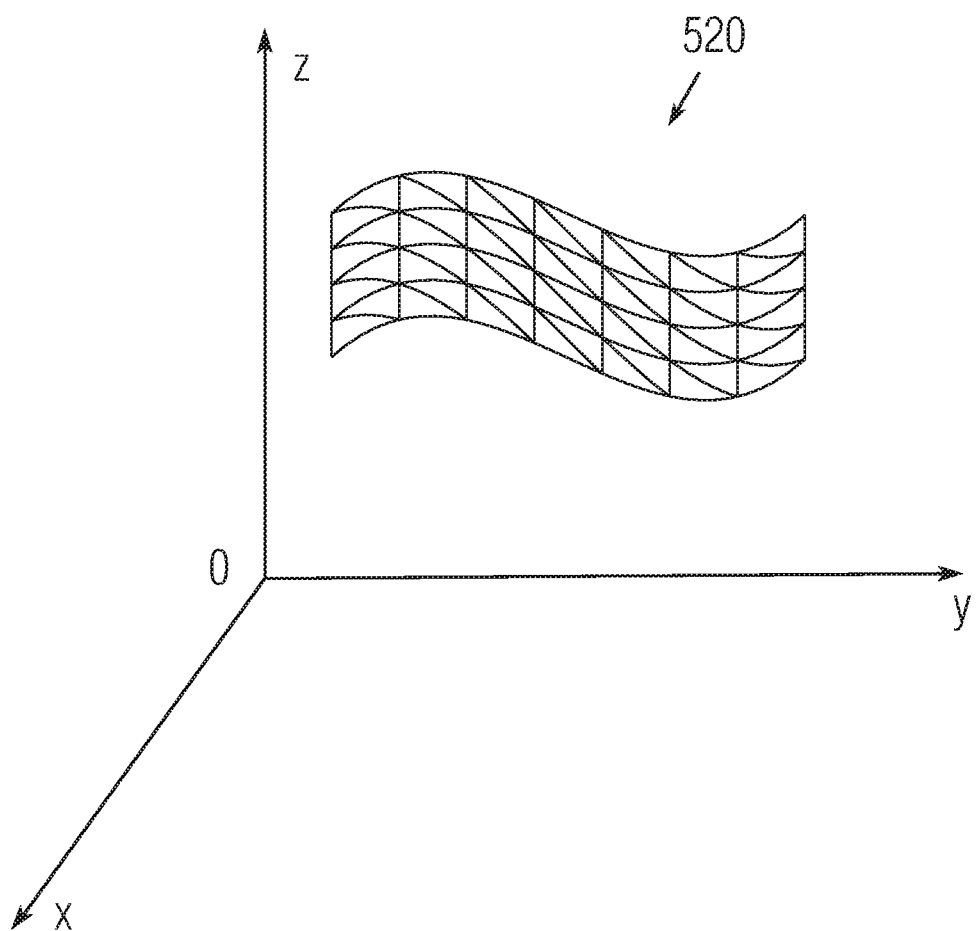
FIG. 5B is a three-dimensional graphical representation of approximated feature values of the surface-image data of FIG. 5A according to an embodiment of the present invention.
Figure 5C:
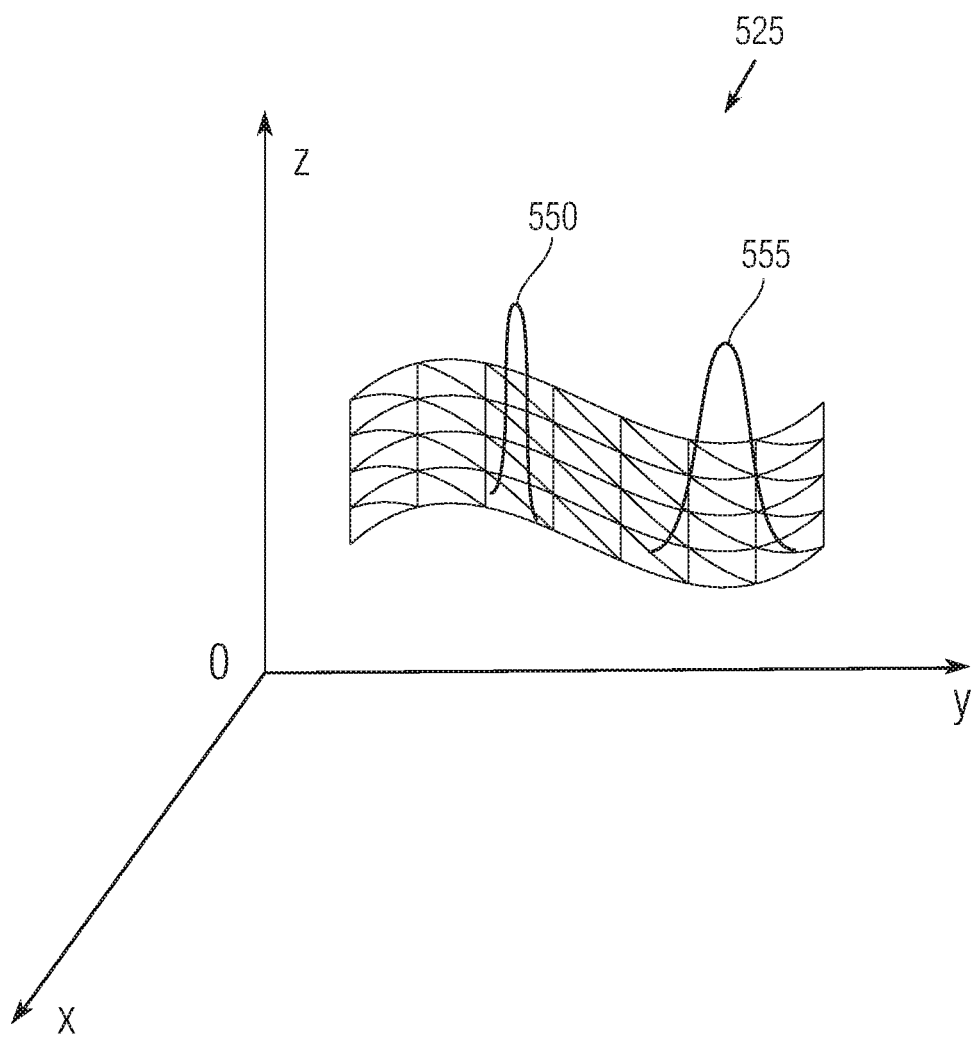
FIG. 5C is a three-dimensional graphical representation of processed surface-image data overlaid on the graphical representation of surface-image data of FIG. 5B according to an embodiment of the present invention.

FIGS. 5A-5C depict a graphical representation of the exemplary image data at various stages of processing according to routine 300. FIG. 5A depicts an example surface-image data-set 515 comprising observed/measured feature values and sub-divided into a network of triangle planes (e.g., at step 315). FIG. 5B depicts an example surface-image data-set 520 comprising approximate feature values for respective triangle planes, as calculated at step 320. FIG. 5C depicts a surface-image data-set 525 comprising adjusted feature values calculated by base-plane subtraction of the observed feature values z (as shown in FIG. 5A), overlaid on the approximate feature values Z, as shown in FIG. 5B (e.g., at step 325). The adjusted feature values are shown overlaid on top of the sub-divided surface-image of FIG. 5A so as to highlight the corresponding location of the features presenting in the adjusted feature value image.

The disclosed exemplary processes for surface-image data analysis provide a specific approach that includes steps for image-surface subdivision and surface approximation followed by base-plane subtraction that result in salient changes in the measured feature value occurring within a particular triangular plane to remain within the resulting adjusted feature value data-set. In addition, changes in the feature value occurring over an area that it is greater than the size of an individual triangle are at least partially smoothed out after subtraction. Accordingly, rapid changes (i.e., changes in z that occur within a particular triangle plane) are highlighted relative to "slower" changes (e.g., changes extending over a larger area). However, it can be appreciated that, depending on the magnitude of such slower changes, which extend over a larger area, such changes can still present in the resulting adjusted feature value data-set, albeit de-emphasized. Accordingly, whether a particular feature is represented in the adjusted feature value data-set can be a function of both magnitude and size/area.

Ultimately, base-plane/baseline approximation and then subtraction serves to remove feature values that are generally shared across the surface and would be represented in the baseline approximation of the surface image generated at step 320 and subtracted out at step 325. Similarly, as a result of the particular method for surface approximation and baseline subtraction, changes in feature value that present over larger areas, which can commonly result from environmental or inspection conditions and changes thereof (e.g., the distance or angle of the inspection device relative to the imaged surface during inspection, lighting conditions, the particular contours of the surface, temperature, and the like) are similarly smoothed out (e.g., de-emphasized) within the final processed data set comprising the adjusted feature-value data set. Thus the particular combination of steps result in a robust feature detection process that is mathematically simplified and rendered more efficient, as many changing environmental and inspection conditions do not need to be accounted for, and without sacrificing accuracy in detecting and isolating salient features such as material deformation. From a practical standpoint the inspection process is operationally more efficient as well, because feature data values can be measured and captured irrespective of changing in environmental and inspection conditions.

In regard to the practical NDT application, feature values resulting from material deformation typically vary substantially from the approximated feature values, while feature values (and changes in feature value) that do not correspond to material deformation have measured feature values close to the approximated values. Accordingly, the feature values corresponding to material deformation remain in the final image data after subtraction of the baseline (i.e., the approximated feature values of the triangle planes) and are shown in the resulting processed surface-image as abrupt changes. More specifically, the surface deformation can be described as having a "sharp" value because the measured value deviates greatly from the approximated value for a respective plane and can presents as a peak in the processed image. By comparison, measured values resulting from other environmental changes (e.g., underlying changes in the shape of the material or variations in inspection conditions like inspection angle) do not deviate as significantly from the approximated values.

FIG. 5C illustrates an example of sharp feature value changes that persist in the surface-image data after baseline subtraction. As noted, in some cases, a change in feature value does not cross a triangle plane boundary, i.e. remains within or on the boundary of one triangular plane. The peak 550 on the left of FIG. 5C is an example of a sharp value not crossing a triangle plane boundary (e.g., a boundary between adjacent triangles). In some exemplary implementations, a feature value change crosses multiple triangular planes and remains as a sharp feature in the processed image after baseline subtraction. The peak 555 on the right of FIG. 5C is an example of a sharp feature value that crosses multiple triangular planes. As noted, a sharp change in feature value that crosses multiple triangular planes has been, to some degree, smoothed out (e.g., decreased in magnitude) through baseline subtraction, while the sharp value within a single triangle remains relatively unaffected.

Figure 5D:
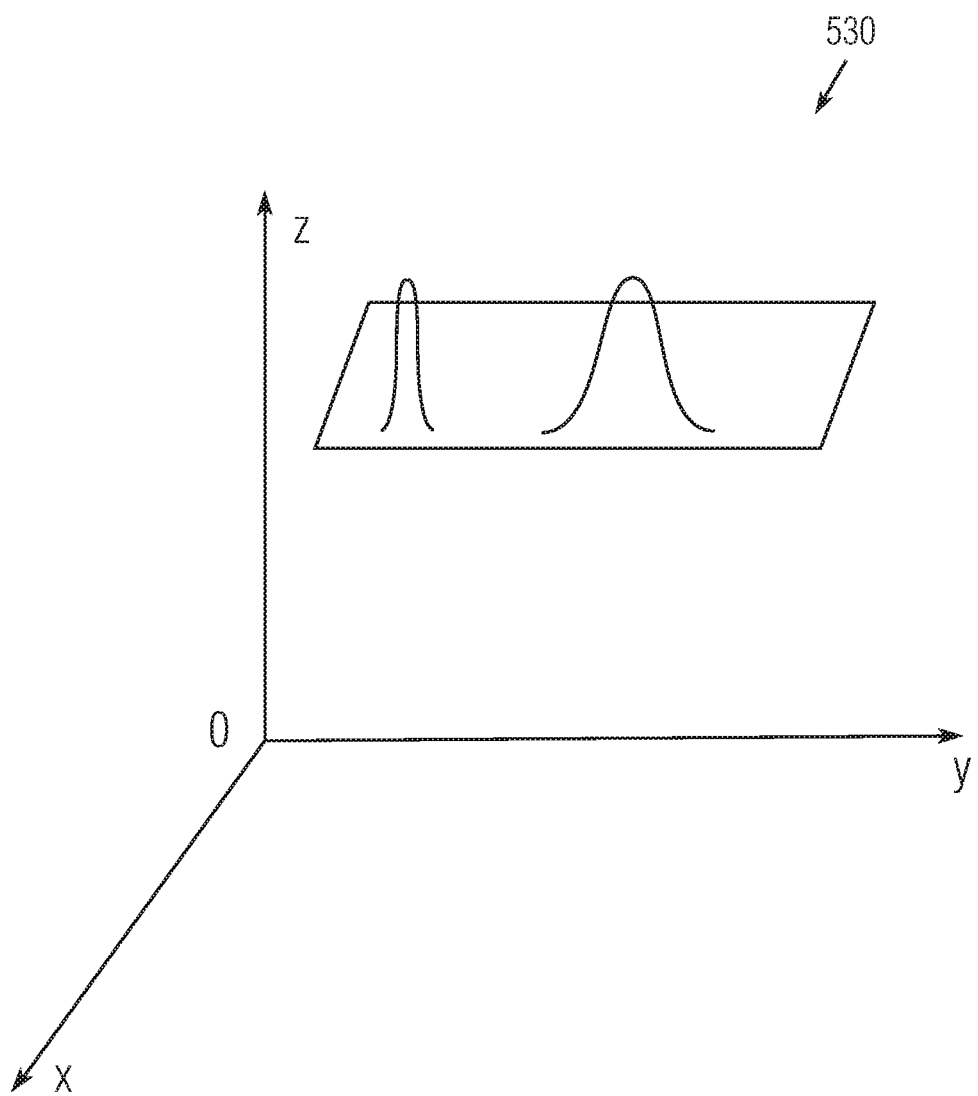
FIG. 5D is a three-dimensional graphical representation of the processed surface-image data of FIG. 5C according to an embodiment of the present invention.

In step 330, a processed multi-dimensional image of the surface can be generated. More specifically, the processor 240, which is configured by executing one or more of the software modules, including, preferably, the image generation module 294, can generate a graphical representation (e.g., an image) depicting the surface based on the adjusted feature value V of each data-point. As can be appreciated, through generating the processed multi-dimensional image of the surface based on the adjusted feature values Z of each data-point, the data set defining the processed multi-dimensional image of the surface differs from the data set in the provided image data. FIG. 5D is an exemplary graphical illustration of a processed multi-dimensional image 530 showing the adjusted feature values V.

Figure 5E:
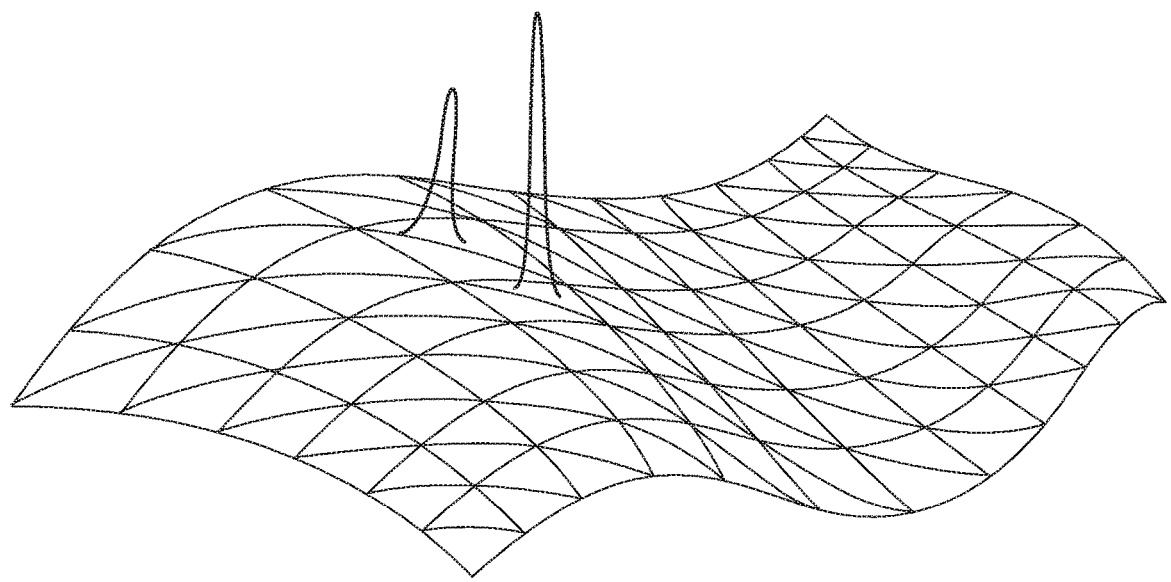
FIG. 5E is a three-dimensional graphical representation of processed surface-image data overlaid on a triangulated map of surface-image data according to an embodiment of the present invention.
Figure 5F:
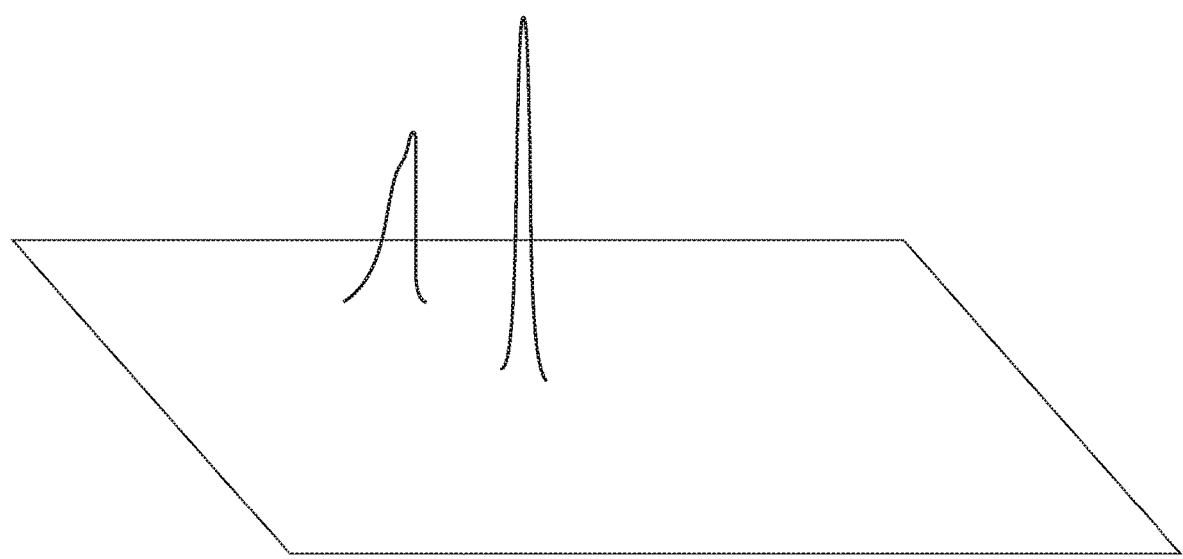
FIG. 5F is a three-dimensional graphical representation of processed surface-image data of FIG. 5E according to an embodiment of the present invention.

By way of further example, FIG. 5E is a three-dimensional graphical representation of processed surface-image data overlaid on a triangulated graphical representation of surface-image data. In particular, FIG. 5E illustrates an alternative example in which adjusted feature values representing sharp feature value changes persist in the data set after baseline subtraction and wherein both instances of sharp feature value changes do not cross a triangle plane boundary (e.g., remain within or on the boundary of one triangular plane, respectively). FIG. 5F graphically illustrates the processed multi-dimensional image 530 showing the adjusted feature values V without being overlaid on the triangulated map of surface image data.

Figure 5G:
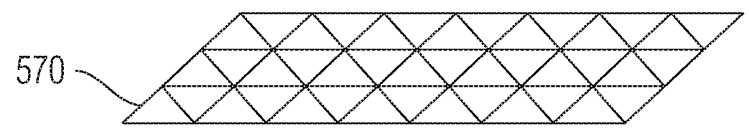
FIG. 5G is an exploded view of three-dimensional graphical representations of layers of surface-image data processed according to an embodiment of the present invention.
Figure 5G:
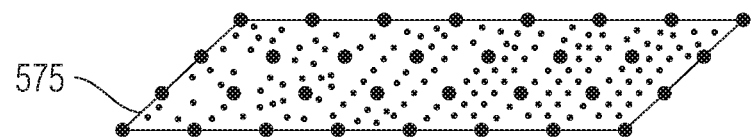
Figure 5G:
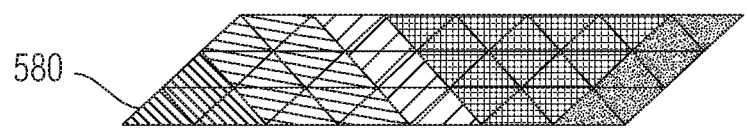
Figure 5G:
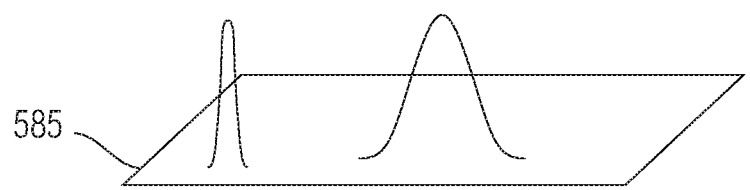

In some implementations, the processed multi-dimensional image generated by the processor can contain several layers of information generated at various steps of the exemplary routine 300. For instance, as shown in FIG. 5G, the layers of information can include a location data layer 575, a triangular network layer 570 illustrating the subdivisions of the surface image, an original measured feature value layer 580 (e.g., the original surface image illustrating measured value of hue for respective locations), and a final surface-image layer 585 generated based on the adjusted feature value. The configured processor output the final processed image and layers together or separately. In addition, the image that is generated can be formatted as vector data or raster data, as would be understood in the art.

In step 335, one or more image layers including, preferably, the processed multi-dimensional image of the surface can be output by the processor 240 using the display 270 of computing device 200. More specifically, the processor 240 using the display 270 can graphically output the final processed image to an operator and thereby graphically present features from the original surface-image that correspond to material deformation, as detected and isolated according to steps 305-330 of the routine 300. For instance, the graphical output can include Whereas the existing technologies primarily concentrate on averaging, smoothing and isolating features based on frequency and can be further limited in that they require monitoring and mathematically adjusting for changing environmental and inspection conditions, the foregoing disclosed embodiments apply a particular set of rules according to a specific approach that is unconventional in the art and achieves practical benefits in terms of accuracy and processing efficiency, among other things. More specifically, according to a salient aspect, the processed multi-dimensional image generated based on the calculated adjusted feature values Z depicts, in a graphical representation, changes in measured feature values z occurring within a given triangle plane with greater emphasis relative to changes in measured feature values z occurring over an area comprising multiple triangle planes. Moreover, benefits achieved by the disclosed systems and methods in the NDT implementation include the ability to identify deformations irrespective of changes in inspection condition variables, i.e., lighting, relative orientation of the inspection device and the material, distance of the inspection device and the material, etc. As a further result, the deformation analysis is simplified and more efficient, not only from a computational point of view, but also from an operational point of view, as the inspection device does not necessarily require sensors for monitoring inspection conditions (e.g., using a proximity sensor, angle sensor and even specific light sources).

Illustrative embodiments and arrangements of the present systems and methods provide a system and a computer implemented method, computer system, and computer program product for analyzing multi-dimensional surface image data to, inter alia, detect deformation of the imaged structure. The flowchart and block diagrams in the figures illustrate the architecture, functionality, and operation of possible implementations of systems, methods and computer program products according to various embodiments and arrangements. In this regard, each block in the flowchart or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is to be understood that any structural and functional details disclosed herein are not to be interpreted as limiting the systems and methods, but rather are provided as a representative embodiment and/or arrangement for teaching one skilled in the art one or more ways to implement the methods.

The subject matter described above is provided by way of illustration only and should not be construed as limiting. The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

While the present invention has been described above using several specific examples and embodiments, there are modifications and variations that will be apparent to those having ordinary skill in the art. As such, the described embodiments are to be considered in all respects as illustrative, and not restrictive. Therefore, the scope of the invention is indicated by the appended claims, rather than by the foregoing description. All changes that come within the meaning and range of equivalency of the claims are to be embraced within their scope.

What is claimed is:

1. A computer implemented method for detecting deformation of a structure from multi-dimensional image data of a surface of the structure captured with an optical inspection device, the method comprising:
   providing the multi-dimensional image data at a processor, the image data comprising a plurality of data-points measured using the optical inspection device, each data-point including:
      a respective location on the surface that a respective data-point was captured; and
      a respective feature value z for the respective data-point measured using the inspection device;
   dividing, with the processor, the surface represented by the image data into multiple planes;
   calculating, with the processor, approximate feature values V for the planes, wherein the approximate feature value for a respective plane is calculated based on the measured feature value of one or more of the data-points within the respective plane;
   calculating, with the processor based on the feature value, an adjusted feature value Z for the plurality of data-points, wherein the adjusted feature value for a respective data-point is calculated based on the measured feature value z for the respective data-point and the calculated approximate feature value V for a plane that the respective data-point is within;
   generating, with the processor based on the adjusted feature values Z, a processed multi-dimensional image of the surface in which the data set for the processed multi-dimensional image differs from the data set in the provided image data; and outputting, with the processor using a graphical display, the processed multi-dimensional image of the surface, wherein the processed multi-dimensional image depicts in a graphical representation the detected deformation of the surface within respective planes of the divided image data.

2. The method of claim 1, wherein the step of calculating the adjusted feature values Z for inclusion in the processed multi-dimensional image further comprises baseline subtraction of the calculated approximate feature value V, for a given plane and each of its respective data-points, from the measured feature value z for each said respective data-point.

3. The method of claim 1, wherein the surface is divided into triangle-shaped planes and wherein the approximate feature value V for the respective triangle plane is calculated according to a triangular plane equation and based on measured data-points that correspond to respective vertices of the respective triangle plane.

4. The method of claim 1, wherein the processed multi-dimensional image generated based on the adjusted feature values Z depicts in a graphical representation changes in measured feature values z occurring within a given plane with greater emphasis relative to changes in measured feature values z occurring over an area comprising multiple planes.

5. The method of claim 1, wherein the dividing step is performed by applying a surface dividing model, and further comprising:

generating, with the processor, the surface dividing model specifying a number of the planes as a function of dimensions of the surface represented by the image data and a size of features corresponding to deformation to be detected from the image data.

6. The method of claim 1, wherein the step of providing comprises:

measuring, using the inspection device, the plurality of data-points using the optical inspection device; and generating the multi-dimensional image data.

7. The method of claim 6, wherein the feature value data is a measure of hue of diffracted radiation captured using the inspection device.

8. The method of claim 1, wherein the surface represented by the image data is divided into multiple parallelogram-shaped planes.

9. The method of claim 8, wherein the parallelogram-shaped planes are each subdivided into two triangle planes, respectively.

10. The method of claim 9, wherein each parallelogram plane is further divided along a diagonal line extending between two vertices thereof, such that the diagonal line defines a shared edge of two respective triangle planes.

11. The feature value Z in claim 1, wherein the calculated approximate feature value V for a respective plane is represented as one or more of a value, vector, and equation and is calculated from the measured feature value z of one or more data-points located within the respective plane.

12. The method of claim 11, wherein the approximate feature value Z for the respective plane is calculated from the measured feature value z of data-points located at vertices of the respective plane.

13. A system for detecting deformation a structure from multi-dimensional image data of a surface of the structure captured with an optical inspection device, the system comprising:

a computer readable storage medium;

a communication interface;

a display;

one or more processors configured to access the storage medium and in operative communication with the communication interface and the display; and software modules stored on the storage medium and executable by the processor, wherein the software modules including:

a communication module that, when executed by the processor, configures the processor to, using the communication interface, receive the multi-dimensional image data including a plurality of data-points measured using the optical inspection device, the data-points comprising: a respective location on the surface that a respective data-point was captured, and a respective feature value z for the respective data-point measured using the inspection device;

a surface dividing module that, when executed by the processor, configures the processor to, divide the surface represented by the image data into multiple;

a feature detection module that, when executed by the processor, configures the processor to calculate a respective approximate feature value V for each of the planes, wherein the approximate feature value V for a respective plane is calculated based on the measured feature value v of one or more of the data-points within the respective plane, and wherein the feature detection module further configures the processor to calculate an adjusted feature value Z for each of the plurality of data-points, wherein the adjusted feature value Z for a respective data-point is calculated based on the measured feature value z for the respective data-point and the calculated approximate feature value V for a plane that the respective data-point is within; and an image generation module that, when executed by the processor, configures the processor to generate, based on the adjusted feature value Z of each data-point, a processed multi-dimensional image of the surface in which the data set for the processed multi-dimensional image differs from the data set in the received image data, and further configures the processor to output the processed multi-dimensional image of the surface using the display, wherein the processed multi-dimensional image depicts in a graphical representation the detected deformation of the surface within respective planes of the surface.

14. The system of claim 13, wherein the planes are triangle shaped and wherein the approximate feature value V for the respective plane is calculated according to a triangular plane equation and based on measured data-points that correspond to respective vertices of the respective plane.

15. The system of claim 13, wherein the adjusted feature values Z inclusion in the processed multi-dimensional image further is calculated by baseline subtraction of the calculated approximate feature value V, for a given plane, from the measured feature value z for each respective data-point in said given plane.

16. The system of claim 13, further comprising:

an optical inspection device configured to measure the plurality of data-points and generate the multi-dimensional image data.

17. The system of claim 13, wherein the surface dividing module further configures the processor to generate the surface dividing model specifying a number of planes as a function of dimensions of the surface represented by the image data and a size of features corresponding to deformation to be detected from the image data.

* * * * *